Figure 1:
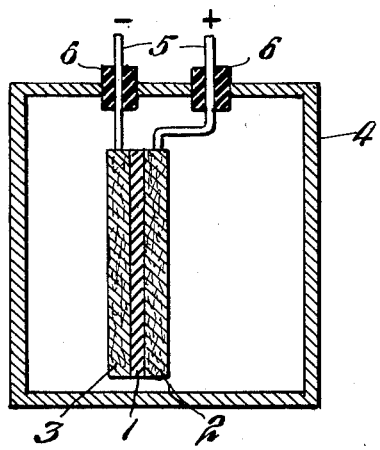

July 2, 1957   F. PETERS   2,798,110
OXIDIZABLE ELECTRODE FOR SEALED ALKALINE STORAGE CELLS
Filed March 23, 1953

INVENTOR.
FREIMUT PETERS
BY
Richardson, David and Nordon
ATTORNEYS.

United States Patent Office 2,798,110
Patented July 2, 1957

2,798,110

OXIDIZABLE ELECTRODE FOR SEALED ALKALINE STORAGE CELLS

Freimut Peters, Hagen, Westphalia, Germany, assignor to Accumulatoren - Fabrik Aktiengesellschaft, Hagen, Westphalia, Germany, a joint-stock company of Germany Application March 23, 1953, Serial No. 344,210

Claims priority, application Germany March 28, 1952

1 Claim. (Cl. 136—6)

This invention relates to electric accumulators and more especially to the permanently sealed type of accumulators operating with alkaline electrolytes.

It is an object of this invention to provide new means for absorbing the gases developed in these cells.

It has already been suggested to cope with the gases developed in such accumulators by altogether fixing the electrolyte in a porous separator and thereby bringing the electrolyte as well as the gases developed therein by capillary action into contact with the electrodes for the purpose of getting the gases absorbed. In accumulators of this type the capacities of the two electrodes had to be brought to a predetermined ratio by using a larger negative electrode and taking care to create predetermined charging conditions when gastightly sealing the container. The negative electrode was required to have a higher capacity for accumulating a charging current than the positive electrode, in order to avoid as far as possible the development of hydrogen. The reason for this was that, in contrast to the oxygen which during charging is freed at the positive electrode, it was not possible outright to obtain an absorption of the hydrogen.

It has also been suggested to bring about the absorption of the gases by using skeleton structures consisting of a sintered metal, for instance sintered nickel, to induce the oxygen and the hydrogen to enter anew into reaction with each other. In the operating of this process it appeared to be particularly advantageous to altogether immerse the electrodes in the electrolyte, but it was found that with accumulators of this kind the effects desired could not be obtained.

I have now found to my surprise that sintered metals, and quite especially sintered nickel, if used as the carriers of the active mass, have the faculty of absorbing the gases provided the electrolyte is stored by capillary action in a porous separator. If this is done, a combined action takes place insofar as I was in a position of showing by tests that after a short period of time a state of equilibrium is reached in which no hydrogen is developed any more. I have found that the negative electrode oxidized to such an extent that during charging of the accumulator the potential of hydrogen development is not reached any more.

This invention also involves the technical improvement of rendering it possible to dispense with all special actions to guarantee, during the sealing of the accumulator, a higher charging capacity of the negative electrode as compared with the positive electrode. It is obvious that this leads to a saving of material and space.

This accumulator comprises two electrodes 2 and 3 of any type suitable for an alkaline accumulator which are enclosed in a suitable jar 4, and have lead elements 5, 5 extending through insulators 6, 6 into the circumambient air, thereby forming a gas-tight and hermetically sealed arrangement. The electrolyte is held by capillary action entirely within a porous separator 1 which holds apart the respective facing surfaces of both electrodes. The electrodes have a porous skeleton structure of sintered nickel.

Figure 2:
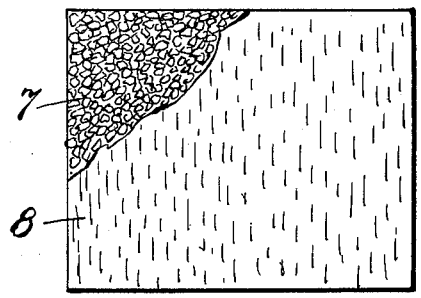

The electrode structure is shown in Fig. 2. Here 7 represents the porous nickel skeleton with which is intermixed the active mass of the electrode, held in the skeleton as a carrier. At the surface 8 the active mass has been at least partly removed, so as to expose a large area of sintered nickel. This surface 8 is preferably the surface which is free to absorb the gas, i. e. the surface not in contact with the separator 1.

The advantages offered by this combination increase by providing, apart from the oxidizable sintered metal skeleton 1, also a highly porous sinter cake portion of the skeleton 1 which is capable of forming or holding the active mass and being in an electric and preferably a mechanical connection with the frame or main body of one or both of the two electrodes 3 and 4. This combination greatly increases the influence of the sintered metal on the absorption of the gases by increasing the freely accessible oxidation surface of the sintered porous metal structure as compared with a structure altogether covered or embedded in the active mass.

In the drawing illustrating diagrammatically by way of example an embodiment of the invention Fig. 1 is an elevation of a sintered electrode plate, Fig. 2 a vertical, and Fig. 3 a horizontal section, on the line A—B in Fig. 2, of an accumulator according to this invention.

In the drawing 1 is a positive and 2, 2 are two negative electrodes. Between them is arranged the porous separator 3 which retains by capillary action the entire electrolyte. A gas-and-liquid tightly closed container 4 surrounds these parts. The terminals 5 and 6 are fixed in the container wall and isolated therefrom. Owing to the fixing of the electrolyte within the separator the gas (oxygen) developed in the container fills the empty cavities 7 within this cell and in contact with the large-surface sintered negative electrodes so far depolarizes these electrodes that on the accumulator being charged no hydrogen is developed.

Various changes may be made in the composition and arrangement of the various components of accumulators according to this invention without departing from it or sacrificing the advantages thereof.

I claim:

An accumulator of the hermetically sealed alkaline type having two composite electrodes comprising a porous skeleton structure of sintered nickel and active mass, said skeleton of sintered nickel having one surface uncovered by the active mass, a porous separator closely bound between the respective electrodes, and an electrolyte substantially completely absorbed within said separator, whereby oxygen freed by electrolysis is substantially completely absorbed by said uncovered surface.

References Cited in the file of this patent

UNITED STATES PATENTS

| | | |
|---|---|---|
| 2,651,669 | Neumann | Sept. 8, 1953 |
| 2,724,733 | Hagspihl et al. | Nov. 22, 1955 |

FOREIGN PATENTS

| | | |
|---|---|---|
| 653,235 | Great Britain | May 9, 1951 |